2,957,853
TERPOLYMER SYSTEMS CONTAINING CARBOXYL GROUPS AND HYDROXYL GROUPS

Earl C. Chapin, Springfield, Mass., and Richard F. Smith, Delmar, N.Y., assignors to Monsanto Chemical Company, St. Louis, Mo., a corporation of Delaware No Drawing. Filed June 20, 1956, Ser. No. 592,491

7 Claims. (Cl. 260—80.5)

This invention relates to new terpolymers. More particularly, this invention relates to terpolymers containing free carboxyl groups and free hydroxyl groups.

An object of this invention is to provide new terpolymers.

A further object of this invention is to provide terpolymers containing both free carboxyl groups and free hydroxyl groups.

These and other objects of the present invention are attained by interpolymerizing an allyl alcohol compound with a vinyl ester of a monocarboxylic acid and an alpha,beta-ethylenically unsaturated monocarboxylic acid.

The following examples are set forth to illustrate more clearly the principle and practice of this invention to those skilled in the art. All parts are by weight.

Example I

A mixture of 75 parts of vinyl acetate, 20 parts of allyl alcohol, 5 parts of crotonic acid and 3 parts of ditertiary butyl peroxide are charged to a sealed reaction vessel and heated for 0.5 hour at 180° C. The product obtained consists of 48 parts of a viscous liquid polymer dissolved in unreacted monomers. The unreacted monomers are removed by vacuum distillation and the recovered polymer analyzes approximately 82% vinyl acetate, 10% allyl alcohol and 8% crotonic acid.

Example II

Example I is repeated except that the monomers charged to the reaction consist of 71 parts of vinyl acetate, 19 parts allyl alcohol and 10 parts crotonic acid. The polymer obtained analyzes approximately 84% vinyl acetate, 9% allyl alcohol and 7% crotonic acid.

Example III

Example I is repeated except that the monomers charged to the reaction consist of 50 parts of vinyl acetate, 47 parts of allyl alcohol and 3 parts of crotonic acid. The polymer obtained contains a higher percentage of allyl alcohol than the products of Examples I and II.

Example IV

A mixture of 70 parts of vinyl pelargonate, 21 parts of allyl alcohol, 9 parts of crotonic acid and 3 parts of ditertiary butyl peroxide are charged to a sealed reaction vessel and heated for 0.5 hour at 200° C. Sixteen parts of polymer are obtained which analyzes approximately 84% vinyl pelargonate, 7% allyl alcohol and 9% crotonic acid.

Example V

Example IV is repeated except that the monomer mixture charged consists of 75 parts vinyl pelargonate, 23 parts allyl alcohol and 2 parts crotonic acid. The polymer obtained analyzes approximately 89% vinyl pelargonate, 8% allyl alcohol and 3% crotonic acid.

The three components of the terpolymers of this invention are (1) an allyl alcohol compound of the group consisting of allyl alcohol, methallyl alcohol and mixtures thereof, (2) a vinyl ester of a monocarboxylic acid and (3) an alpha,beta-ethylenically unsaturated monocarboxylic acid. The vinyl ester included in the terpolymers may be the ester of essentially any 1–20 carbon atom monocarboxylic acid that is free of olefinic and/or acetylenic unsaturation, but preferably is a vinyl ester of a saturated aliphatic carboxylic acid such as vinyl acetate, vinyl propionate, vinyl pelargonate, vinyl stearate etc., or a vinyl ester of an aromatic carboxylic acid such as vinyl benzoate. Examples of the alpha,beta-ethylenically unsaturated monocarboxylic acids that may be incorporated in the terpolymers include acrylic acid, methacrylic acid, crotonic acid, cinnamic acid, etc. Mixtures of suitable vinyl esters or alpha,beta-ethylenically unsaturated acids may be employed in lieu of single components if desired.

The terpolymers of this invention contain 1–40 weight percent of the allyl alcohol compound, 30–95 weight percent of the vinyl ester of the monocarboxylic acid, and 1–50 weight percent of the alpha,beta-ethylenically unsaturated monocarboxylic acid. In a preferred embodiment of the invention the terpolymers contain 1–10 weight percent of the allyl alcohol component, 1–10 weight percent of the alpha,beta-ethylenically unsaturated monocarboxylic acid and the balance the vinyl ester of a monocarboxylic acid.

In the preparation of the terpolymers of this invention, the three monomer components should be mixed together either with or without an organic solvent that is inert to the reactants. Preferably, 0.1–5 parts of a free radical generating polymerization initiator will be incorporated in each 100 parts of the monomer mixture. Examples of such initiators include ditertiary butyl peroxide, benzoyl peroxide, tertiary butyl perbenzoate, etc. The reaction mixture should be heated in a closed pressure-resistant reaction vessel to a temperature of 100–250° C. under autogenous pressure. The reaction should be run for periods of 15 to 75 minutes to obtain conversions ranging from 30% to 70% depending upon the particular reaction conditions chosen.

The products of the polymerization step are generally syrupy liquids which comprise a solution of desired terpolymer in unreacted monomers and solvent if a solvent is used. The terpolymer is easily recovered from such syrups by removing the unreacted monomers and solvent by vacuum distillation or by other conventional drying techniques. The terpolymers range in physical properties from viscous liquids to hard colorless brittle resins.

The products of this invention are particularly useful as the main resin constituent in coating compositions which also contain relatively minor amounts of other coating resins containing functional groups that are reactive with the hydroxyl and/or carboxyl group contained in the terpolymers of this invention. Examples of coating resins which contain such reactive groups are the alkyd resins, the phenol-urea-, and melamine-formaldehyde condensates, the epoxy resins, etc. Among the most valuable coating compositions that can be prepared from the terpolymers of this invention are those compositions comprising a major amount of the terpolymer and a minor amount of a methylol melamine ether. Alternatively, the terpolymers of this invention may be used in relatively small amounts as modifiers for coating resins of the type described immediately above. The terpolymers of this invention also may be employed to prepare air-drying varnish resins. Such varnish resins may be prepared by esterifying the terpolymers of this invention with unsaturated fatty acids derived from the drying and semi-drying oils such as linseed oil, soybean oil, cotton seed oil, etc.

Example VI

A coating composition is prepared by dissolving 4 parts of the terpolymer of Example I and 2 parts of a tetrapropyl ether of tetramethylol melamine in 4 parts of a 50/50 xylol-butanol solvent mixture. Films of this coating composition are cast on tin plate, air-dried and cured by heating for 20 minutes at 150° C. The resulting films are hard, have excellent adhesion to the tin plate and excellent xylol resistance.

Various pigments, fillers, dyes and other conventional coating composition additives may be added to the coating compositions such as those described in Example VI. Other organic solvents may be used as the vehicle for the coating compositions, e.g., ketone such as acetone and methyl ethyl ketone, benzene and aliphatic alcohols.

The above descriptions and particularly the examples are set forth by way of illustration only. Many other variations and modifications thereof will be obvious to those skilled in the art and can be made without departing from the spirit and scope of the invention herein described.

What is claimed is:

1. A terpolymer of monomers consisting of (1) 1-40 weight percent of an allyl alcohol compound of the group consisting of allyl alcohol, methallyl alcohol and mixtures thereof, (2) 30-95 weight percent of a vinyl ester of a 1-20 carbon atom monocarboxylic acid that is free of olefinic and acetylenic unsaturation, and (3) 1-50 weight percent of an alpha,beta-ethylenically unsaturated monocarboxylic acid.

2. A terpolymer as in claim 1 wherein the allyl alcohol compound is allyl alcohol.

3. A terpolymer as in claim 1 wherein the vinyl ester of the monocarboxylic acid is vinyl acetate.

4. A terpolymer as in claim 1 wherein the alpha,beta-ethylenically unsaturated monocarboxylic acid is crotonic acid.

5. A terpolymer of monomers consisting of 1-40 weight percent allyl alcohol, 30-95 weight percent vinyl acetate and 1-50 weight percent crotonic acid.

6. A terpolymer of monomers consisting of 1-40 weight percent allyl alcohol, 30-95 weight percent vinyl pelargonate and 1-50 weight percent crotonic acid.

7. A process for preparing a terpolymer of an allyl alcohol compound of the group consisting of allyl alcohol, methallyl alcohol and mixtures thereof, a vinyl ester of a 1-20 carbon atom monocarboxylic acid that is free of olefinic and acetylenic unsaturation and an alpha,beta-ethylenically unsaturated monocarboxylic acid which comprises heating a monomer mixture consisting of 19-47 weight percent of the allyl alcohol compound, 50-75 weight percent of the vinyl ester and 2-10 weight percent of the unsaturated carboxylic acid to a temperature of 100-250° C. under autogenous pressure for from 15 to 75 minutes.

References Cited in the file of this patent

UNITED STATES PATENTS

| | | |
|---|---|---|
| 2,263,598 | Starck et al. | Nov. 25, 1941 |
| 2,441,515 | Snyder | May 11, 1948 |
| 2,476,936 | Whetstone | July 19, 1949 |
| 2,557,266 | Dittmar et al. | June 19, 1951 |
| 2,605,257 | Wolf et al. | July 29, 1952 |
| 2,651,626 | De Nie | Sept. 8, 1953 |
| 2,681,897 | Frazier et al. | June 22, 1954 |
| 2,795,573 | Barrett et al. | June 11, 1957 |